US009317396B2

(12) United States Patent
Honda et al.

(10) Patent No.: US 9,317,396 B2
(45) Date of Patent: Apr. 19, 2016

(54) INFORMATION PROCESSING APPARATUS INCLUDING AN EXECUTION CONTROL UNIT, INFORMATION PROCESSING SYSTEM HAVING THE SAME, AND STOP METHOD USING THE SAME

(71) Applicants: Tadashi Honda, Kanagawa (JP); Tetsuharu Kohkaki, Kanagawa (JP); Kenta Yamano, Kanagawa (JP); Tomoya Amikura, Tokyo (JP); Masateru Kumagai, Kanagawa (JP); Yuuichiroh Hayashi, Kanagawa (JP)

(72) Inventors: Tadashi Honda, Kanagawa (JP); Tetsuharu Kohkaki, Kanagawa (JP); Kenta Yamano, Kanagawa (JP); Tomoya Amikura, Tokyo (JP); Masateru Kumagai, Kanagawa (JP); Yuuichiroh Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 176 days.

(21) Appl. No.: 14/162,870

(22) Filed: Jan. 24, 2014

(65) Prior Publication Data

US 2014/0223150 A1  Aug. 7, 2014

(30) Foreign Application Priority Data

Feb. 6, 2013 (JP) ................................ 2013-021263

(51) Int. Cl.
*G06K 15/00* (2006.01)
*G06F 17/00* (2006.01)
(Continued)

(52) U.S. Cl.
CPC .......... *G06F 11/3664* (2013.01); *G06F 3/1208* (2013.01); *G06F 3/1296* (2013.01); *G06F 9/5027* (2013.01); *H04N 1/0044* (2013.01)

(58) Field of Classification Search
CPC ..... G06F 9/4411; G06F 21/6218; G06F 8/20; G06F 8/41; G06F 8/61; G06F 8/71; G06F 3/1204; G06F 3/1288; G06F 3/1225; G06F 3/1226; G06F 3/1285; G06F 17/30893; G06F 7/30873; G06F 7/3089; G06F 3/1208; G06F 3/1203; G06F 3/1296; G06F 9/5027; H04N 1/00; H04N 1/0044; H04N 1/00278; H04N 1/00244; H04N 1/00957; H04N 1/00411

See application file for complete search history.

(56) References Cited

U.S. PATENT DOCUMENTS 5,471,564 A * 11/1995 Dennis .................. G06F 3/1296 358/1.11
6,976,072 B2 * 12/2005 Mathieson ............ G06F 9/5027 709/223

(Continued)

FOREIGN PATENT DOCUMENTS

WO   2012/144164 A1   10/2012

OTHER PUBLICATIONS

Ralph Campbell, 4.3BSD Line Printer Spooler Manual, Jun. 8, 1993, [Retrieved on Jan. 8, 2016]. Retrieved from the internet: <URL: ftp://ftp.bupt.edu.cn/pub/Documents/DistributionRelated/BSD/BSD4.3LinePrinterSpoolerManual.pdf> 7 Pages 1-7.*

(Continued)

*Primary Examiner* — Thuy Dao
*Assistant Examiner* — Anibal Rivera
(74) *Attorney, Agent, or Firm* — IPUSA, PLLC

(57) ABSTRACT

An information processing apparatus includes a first preservation unit configured to preserve execution request information for information processing; an execution unit configured to execute one or more types of the information processing; an execution control unit configured to have the execution unit being capable of executing one of the types of the information processing execute the information processing of the execution request information preserved by the first preservation unit; and a second preservation unit configured to preserve a stop command of the execution unit. If the execution unit does not execute the information processing, the execution control unit checks the second preservation unit if the second preservation unit preserves the stop command to have the execution unit execute a stop procedure.

10 Claims, 18 Drawing Sheets

(51) Int. Cl.
*G06F 15/173* (2006.01)
*G06F 11/36* (2006.01)
*G06F 3/12* (2006.01)
*H04N 1/00* (2006.01)
*G06F 9/50* (2006.01)

(56) References Cited

U.S. PATENT DOCUMENTS

| | | | | |
|---|---|---|---|---|
| 7,707,577 B2 * | 4/2010 | Inaba | ............ | G06K 15/00 358/1.15 |
| 7,903,268 B2 * | 3/2011 | Aoki | ............ | G03G 15/5012 347/19 |
| 8,228,537 B2 * | 7/2012 | Uehara | ............ | H04N 1/00244 358/1.15 |
| 8,867,070 B2 * | 10/2014 | Jazayeri | ............ | G06F 3/1204 358/1.14 |
| 2004/0130746 A1 * | 7/2004 | Wu | ............ | H04N 1/00278 358/1.15 |
| 2005/0036170 A1 * | 2/2005 | Okuoka | ............ | H04N 1/00957 358/1.16 |
| 2005/0190395 A1 * | 9/2005 | Aritomi | ............ | G06F 3/1203 358/1.13 |
| 2007/0188791 A1 * | 8/2007 | Utsunomiya | ............ | H04N 1/00411 358/1.15 |
| 2009/0249346 A1 * | 10/2009 | Harada | ............ | G06F 3/1204 718/102 |
| 2010/0031192 A1 * | 2/2010 | Kong | ............ | H04N 1/00 715/810 |
| 2010/0162407 A1 * | 6/2010 | Hosoda | ............ | G06F 8/61 726/26 |
| 2010/0218093 A1 * | 8/2010 | Sakamoto | ............ | H04N 1/0044 715/274 |
| 2013/0198211 A1 | 8/2013 | Kohkaki et al. | | |
| 2014/0022594 A1 * | 1/2014 | Towata | ............ | G06F 3/1208 358/1.15 |

OTHER PUBLICATIONS

John Mandler, A Printing Solution for a Multimedia Environment, Apr. 1994, [Retrieved on Jan. 8, 2016]. Retrieved from the internet: <URL: ftp://ftp.mrynet.com/operatingsystems/DEC/www.hpl.hp.com/hpjournal/94apr/apr94a6.pdf> 9 Pages 4-52.*

* cited by examiner

FIG.5

| ORGANIZATION ID | ORGANIZATION NAME | COUNTRY | LANGUAGE | ADDRESS INFO | ... |
|---|---|---|---|---|---|
| XXX | CORPORATION A | JAPAN | JAPANESE | CompanyA@print.com | |
| YYY | CORPORATION B | USA | ENGLISH | CompanyB@print.com | |

FIG.6

| ORGANIZATION ID | USER NAME | PASSWORD | ADDRESS INFO | ... |
|---|---|---|---|---|
| XXX | User A | AAA | A@aaa.com | |
| | User B | BBB | B@aaa.com | |
| | User C | CCC | C@aaa.com | |
| YYY | User A | AAA | A@bbb.com | |
| | User D | DDD | D@bbb.com | |

FIG.7

| ORGANIZATION ID | DEVICE AUTHENTICATION INFO | BUSINESS OFFICE INFO | CAPABILITY | ... |
|---|---|---|---|---|
| XXX | 111 | BUSINESS OFFICE A | A4 COLOR | |
| | 222 | BUSINESS OFFICE B | A2 COLOR | |
| | 333 | BUSINESS OFFICE B | A4 MONOCHROME | |
| YYY | 444 | — | A4 COLOR | |

FIG.11

```
{
  "_id":JOB ID,                                    }1
  "tasks":[
    {
      "_id":TASK ID,
      "job_id":PARENT JOB ID,
      "type":"dummy_queue"
      "params":{
        "folder_id":"DESTINATION FOLDER ID FOR PRESERVATION",
        "filename":"FILE NAME FOR PRESERVATION",
        "organization_id":"ORGANIZATION ID",
        "federation_id":"FEDERATION ID",
        "file":"ORIGINAL LOCATION OF FILE TO BE PRESERVED"
      },
    }
  ],
  "user_id":"USER ID",
  "organization_id":"ORGANIZATION ID",
  "app_id":"APP ID",
  "callback_uri":"CALLBACK URL",
  "callback_headers":{"Cookie":"COOKIE INFO FOR CALLBACK"}
}
```

(tasks block braced as 2; outer object braced as 1)

FIG.12

```
{
  "_id": 1,
  "app_id":"APP ID",
  "organization_id":"ORGANIZATION ID",
  "user_id":"USER ID",
  "status":"STATUS",
  "inquiry_code": null,
  "created_at":"2012-12-11T08:28:50Z",
  "updated_at":"2012-12-11T08:30:03Z",
  "callback_uri":"CALLBACK URL",
  "callback_headers":"COOKIE INFO, ETC.",
  "job_params": "RESERVED ELEMENT",
  "tasks":[
    {
      "_id": 1,
      "job_id": 1,
      "type":"ocr",
      "params":{
        "output_type":"doc",
        "language":"French",
        "output_size":"A4"
      }
    },
    {
      "_id": 2,
      "job_id": 1,
      "type":"storage2gdrive",
      "params":{
        "file":"$1.file"
        "folder_id":"FOLDER ID"
        "organization_id":"ORGANIZATION ID"
        "federation_id":"FEDERATION ID"
      }
    }
  ],
```

Brace 1 groups the header fields (_id through job_params).
Brace 2 groups the tasks array.

FIG.13

```
"task_results":[
  {
    "_id": 1,
    "job_id": 1,
    "type":"ocr",
    "params":{
      "output_type":"doc",
      "language":"French",
      "output_size":"A4"
    }
    "error": null,
    "result":{
      "file":"URL OF FILE HAVING PROCESSED",
      "size":1000,
      "task_time": 12.40625,
      "engine_time": 10.28125
    },
    "created_at":"2012-12-11T08:29:10Z",
    "updated_at":"2012-12-11T08:29:23Z"
  },
  {
    "_id": 2,
    "job_id": 1,
    "type":"storage2gdrive",
    "params":{
      "file":"$1.file"
      "folder_id":"FOLDER ID"
      "organization_id":"ORGANIZATION ID"
      "federation_id":"FEDERATION ID"
    }
    "error": null,
    "result": {
      "file":"FILE NAME",
      "id":"FILE ID",
      "url":"FILE URL",
      "task_time": 24.38573,
      "engine_time": 20.18297
    },
    "created_at":"2012-12-11T08:29:34Z",
    "updated_at":"2012-12-11T08:29:58Z"
  }
]
}
```

FIG.14

```
{
  "app_id":"APP ID",
  "organization_id":"ORGANIZATION ID",
  "user_id":"USER ID",
  "callback_uri":"CALLBACK URL",
  "callback_headers":"COOKIE INFO, ETC.",
  "job_params": "RESERVED ELEMENT",
  "tasks":[
    {
      "type":"ocr",
      "params":{
        "output_type":"doc",
        "language":"French",
        "output_size":"A4"
      }
    },
    {
      "type":"storage2gdrive",
      "params":{
        "file":"$1.file"
        "folder_id":"FOLDER ID"
        "organization_id":"ORGANIZATION ID"
        "federation_id":"FEDERATION ID"
      }
    }
  ],
}
```

FIG.15

| FUNCTION | INPUT VALUES | EXPECTED VALUES |
|---|---|---|
| storage2xxx | ·file to be processed<br>·location of destination folder for preservation<br>·authentication info | ·job status is "done".<br>·id is issued by external storage for preservation.<br>·url is obtained for preservation destination. |
| ocr | ·file(s) to be processed<br>·output file format<br>·OCR language<br>·output size | ·job status is "done".<br>·file having processed is obtained from URL in result.<br>·file size is as described in result. |
| pdf2xxx | ·file to be processed<br>·file name<br>·print condition | ·job status is "done".<br>·file having processed is obtained from URL in result.<br>·file size is as described in result.<br>·number of file pages is as described in result. |
| doc2xxx | ·file to be processed<br>·file name<br>·print condition | ·job status is "done".<br>·file having processed is obtained from URL in result.<br>·file size is as described in result.<br>·number of file pages is as described in result. |
| html2pdf<br>text2pdf | ·file to be processed<br>·page size (A4, B4, etc.)<br>·height/width specification<br>·encoding (only for text, UTF-8, sjis, etc.) | ·job status is "done".<br>·file having processed is obtained from URL in result.<br>·file size is as described in result.<br>·number of file pages is as described in result. |
| image2pdf | ·file(s) to be processed | ·job status is "done".<br>·file having processed is obtained from URL in result.<br>·file size is as described in result.<br>·number of file pages is as described in result. | though
INFORMATION PROCESSING APPARATUS INCLUDING AN EXECUTION CONTROL UNIT, INFORMATION PROCESSING SYSTEM HAVING THE SAME, AND STOP METHOD USING THE SAME

BACKGROUND OF THE INVENTION

1. Field of the Invention

The disclosures herein generally relate to an information processing apparatus, an information processing system, and a stop method.

2. Description of the Related Art

Conventionally, a technology is known in that a client sends a print command to a server, then the server that received the print command converts content to be printed into print data. In such a technology, a server provides a service for generating print data to a client.

In recent years, cloud computing has been drawing attention, which is a form of providing services from a server to a client as described above. In cloud computing, many computing resources are used for distributed execution of data conversion and data processing to process a considerable number of requests from clients. There are too many vendors that provide various services by implementing web services in cloud computing environments for realizing cloud computing as described above (see, for example, Patent Document 1).

A server executing data conversion may use, for example, a data conversion engine (a data conversion program, data conversion library, and the like) to improve independence and maintainability of the program.

Also, a server executing some sort of processing other than data conversion may use a data processing engine (a data processing program, data processing library, and the like) to improve independence and maintainability of the program.

If multiple types of data conversion and/or data processing are required, a considerable number of data conversion engines and data processing engines are required. For an information processing system in production use using such data conversion engines and/or data processing engines, it is common to stop the information processing system when updating the data conversion engines and/or data processing engines.

A problem of the information processing system using the data conversion engines and/or data processing engines is that it is not easy to update the data conversion engines and/or data processing engines because the entire information processing system needs to be stopped.

PATENT DOCUMENTS

[Patent Document 1] Japanese Laid-Open Patent Publication No. 2012-226700

SUMMARY OF THE INVENTION

In view of the above, it is a general object of at least one embodiment of the present invention to provide an image processing apparatus, an information processing system, and a stop method that can easily update a program included in the information processing system in operation.

According to at least one of embodiments of the present invention, an information processing apparatus includes a first preservation unit configured to preserve execution request information for information processing; an execution unit configured to execute one or more types of the information processing; an execution control unit configured to have the execution unit being capable of executing one of the types of the information processing execute the information processing of the execution request information preserved by the first preservation unit; and a second preservation unit configured to preserve a stop command of the execution unit. If the execution unit does not execute the information processing, the execution control unit checks the second preservation unit if the second preservation unit preserves the stop command to have the execution unit execute a stop procedure.

According to at least one embodiment of the present invention, it is possible to easily update a program included in an information processing system in operation.

BRIEF DESCRIPTION OF DRAWINGS

FIG. 5 is a configuration diagram of an example of organization information;

FIG. 6 is a configuration diagram of an example of user information;

FIG. 7 is a configuration diagram of an example of device information;

FIG. 11 is a configuration diagram of an example of job information;

FIG. 12 is a first half of a configuration diagram of an example of an indication of job completion;

FIG. 13 is a second half of the configuration diagram of the example of the indication of job completion;

FIG. 14 is a configuration diagram of another example of job information;

FIG. 15 is a schematic view illustrating an example of a correspondence table used for evaluating a job result by a worker;

DETAILED DESCRIPTION OF THE PREFERRED EMBODIMENTS

In the following, embodiments of the present invention will be described with reference to the accompanying drawings.

First Embodiment

System Configuration

Figure 1:
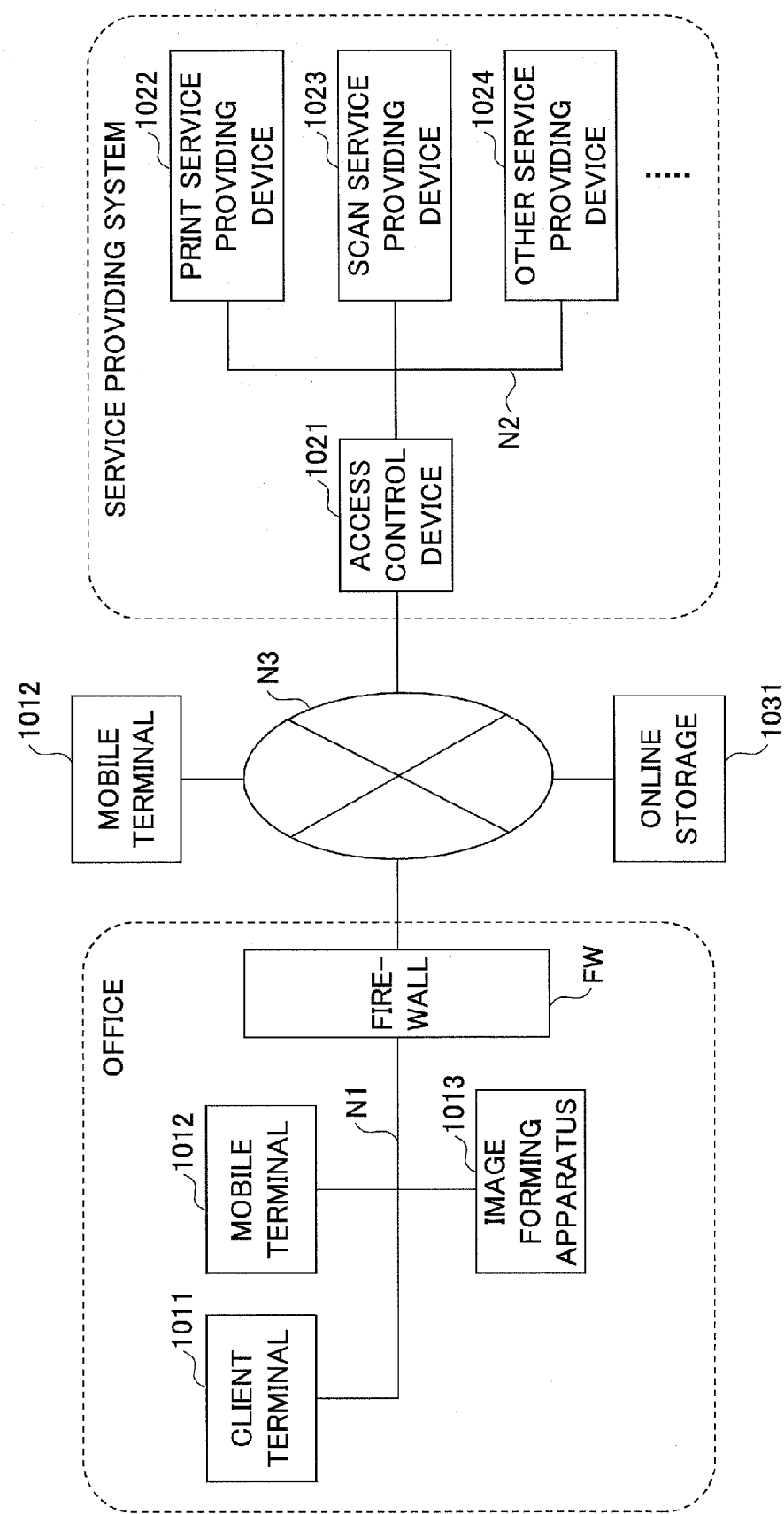
FIG. 1 is a configuration diagram of an example of an information processing system according to a first embodiment.

FIG. 1 is a configuration diagram of an example of an information processing system according to a first embodiment. The information processing system 1000 illustrated in FIG. 1 includes, for example, a network N1 such as a network in an office, a network N2 of a service providing system represented by a cloud service, and a network N3 such as the Internet.

The network N1 is a private network behind a firewall FW. The firewall FW is installed at a contact point between the network N1 and the network N3, and detects and blocks unauthorized access. To the network N1, a client terminal 1011, a mobile terminal 1012, and an image forming apparatus 1013 such as a multifunction peripheral are connected.

The client terminal 1011 is an example of a terminal device. The client terminal 1011 is realized by an information processing apparatus in which a typical OS is installed. The client terminal 1011 includes a unit for performing radio communication or a unit for performing cable communication. The client terminal 1011 is a terminal that can be operated by a user, such as a tablet PC and a notebook PC.

The mobile terminal 1012 is an example of a terminal device. The mobile terminal 1012 includes a unit for performing radio communication or a unit for performing cable communication. The mobile terminal 1012 is a terminal that is portable for a user, such as a smartphone, a mobile phone, a tablet PC, and a notebook PC.

The image forming apparatus 1013 is a device having an image forming function, such as a multifunction peripheral. The image forming apparatus 1013 includes a unit for performing radio communication or a unit for performing cable communication. The image forming apparatus 1013 is a device for performing processes relevant to image formation, such as a multifunction peripheral, a copier, a scanner, a printer, a laser printer, a projector, and an electronic blackboard. FIG. 1 illustrates an example including one of each of the client terminal 1011, the mobile terminal 1012, and the image forming apparatus 1013. There may be a plurality of each of these devices.

The network N2 is connected with the network N3 via an access control device 1021. The security of the network N2 is protected by the access control device 1021. To the network N2, a print service providing device 1022, a scan service providing device 1023, and another service providing device 1024 are connected.

In the information processing system 1000 of FIG. 1, the access control device 1021, the print service providing device 1022, the scan service providing device 1023, and the other service providing device 1024 realize the service providing system. The print service providing device 1022, the scan service providing device 1023, and the other service providing device 1024 provide a print service, a scan service, and other services, respectively.

The access control device 1021 controls a log-in operation to a print service provided by the print service providing device 1022 and a scan service provided by the scan service providing device 1023.

The access control device 1021, the print service providing device 1022, the scan service providing device 1023, and the other service providing device 1024 are realized by one or more information processing apparatus.

The access control device 1021, the print service providing device 1022, the scan service providing device 1023, and the other service providing device 1024 may be realized by being integrated in a single information processing apparatus, or may be realized by being distributed across a plurality of information processing apparatuses.

Part of the services on the network N2 side may be outside the network N2. The mobile terminal 1012 may be outside the network N1 that is a network inside the office. In the example of the information processing system 1000 of FIG. 1, the mobile terminal 1012 is in the network N1 and in the network N3.

An online storage 1031 connected with the network N3 is a device for preserving files. The online storage 1031 may be a device for preserving files provided by a vendor.

Figure 2:
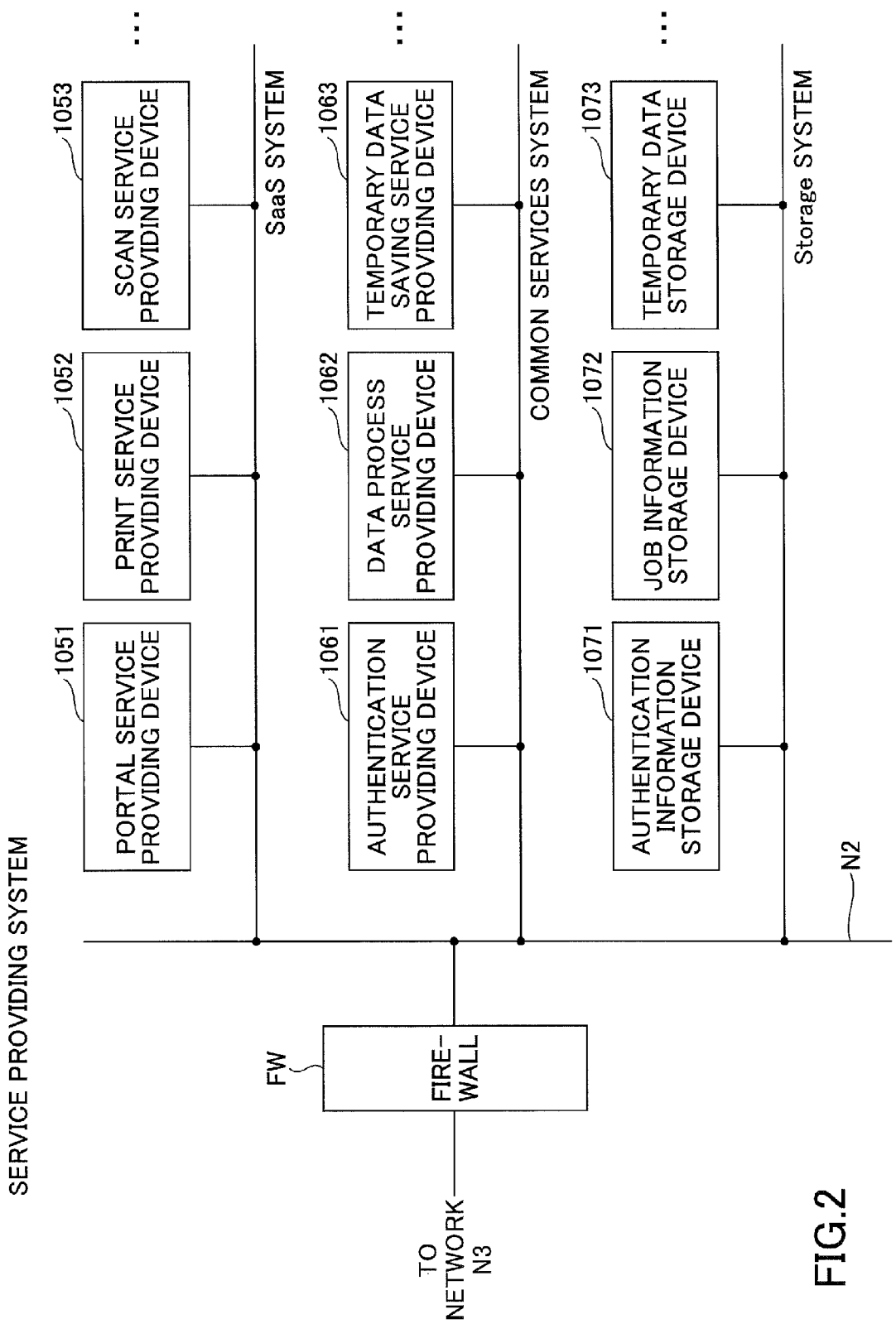
FIG. 2 is a configuration diagram of another example of a service providing system.

The configuration of the service providing system of FIG. 1 is one example. The service providing system may be realized by a configuration illustrated in FIG. 2. FIG. 2 is a configuration diagram of another example of the service providing system. In the service providing system of FIG. 2, the network N2 is connected to the network N3 by a firewall FW.

In the network N2, service providing devices of a SaaS (Software as a Service) system, service providing devices of a common service (Network Service Platform) system, and storage devices of the storage system are connected. The service providing devices of the common service system provides services that can be commonly used by the service providing devices of the SaaS system.

The service providing devices of the SaaS system include service providing devices according to the service to be provided, such as a portal service providing device 1051, a print service providing device 1052, and a scan service providing device 1053. Furthermore, the service providing devices of the common service system include service providing devices according to a common service to be provided, such as an authentication service providing device 1061, a data process service providing device 1062, and a temporary data saving service providing device 1063. The storage devices of the storage system include storage devices according to the information (data) to be stored, such as an authentication information storage device 1071, a job information storage device 1072, and a temporary data storage device 1073.

In the service providing system of FIG. 2, security is protected by authentication services provided by, for example, the firewall FW and the authentication service providing device 1061. Note that the configuration of the service providing system of FIG. 2 is also one example, and the service providing system may have other configurations.

<Hardware Configuration>

Figure 3:
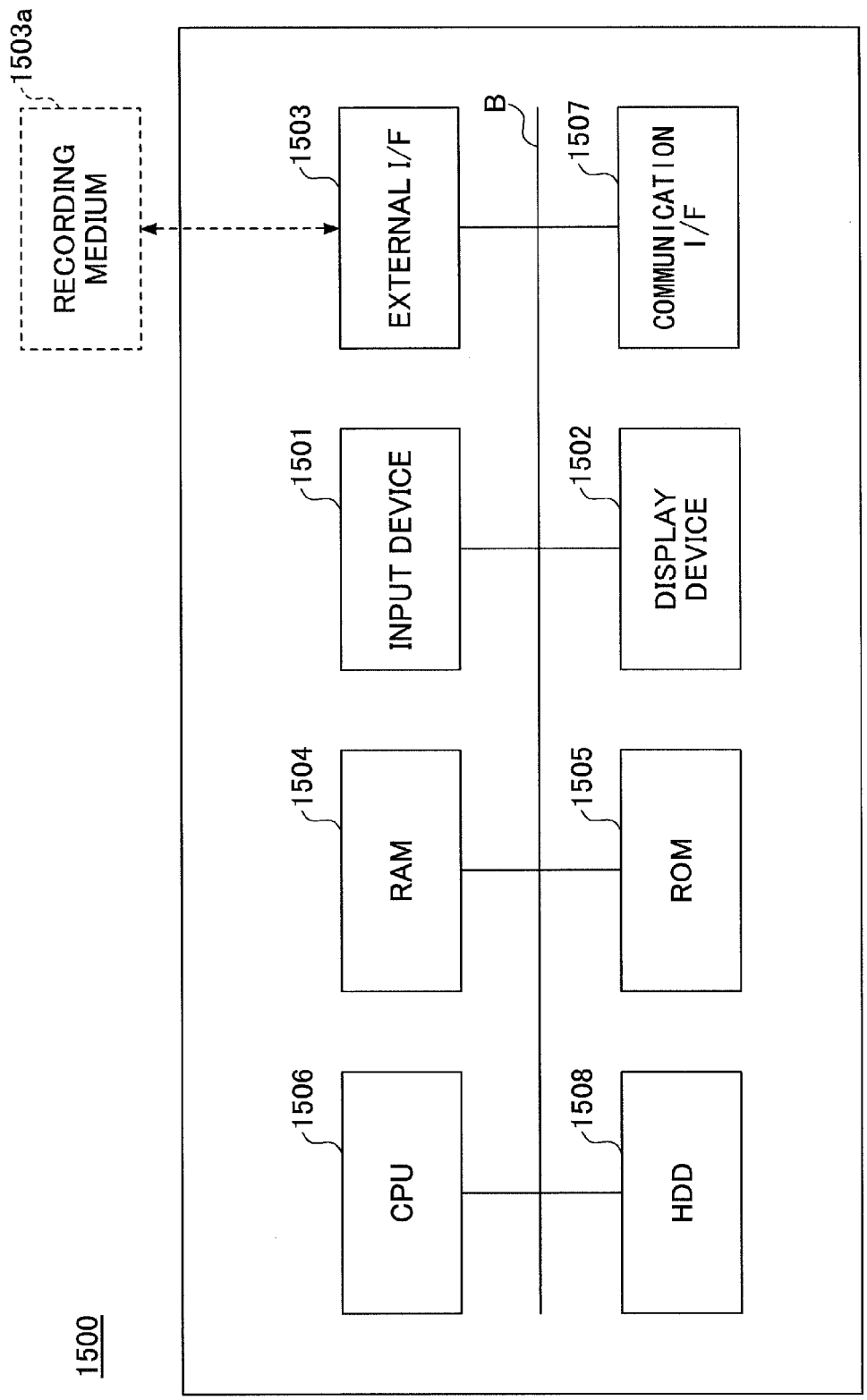
FIG. 3 is a hardware configuration diagram of an example of a computer system.

The client terminal 1011, the mobile terminal 1012, the access control device 1021, the print service providing device 1022, the scan service providing device 1023, and the other service providing device 1024 are realized by, for example, a computer system having a hardware configuration as illustrated in FIG. 3.

The service providing devices of the SaaS system, the service providing devices of the common service system, and the storage devices of the storage system illustrated in FIG. 2 may also be realized by, for example, a computer system having a hardware configuration as illustrated in FIG. 3.

FIG. 3 is a hardware configuration diagram of an example of a computer system. A computer system 1500 illustrated in FIG. 3 includes an input device 1501, a display device 1502, an external I/F 1503, a RAM (Random Access Memory) 1504, a ROM (Read-Only Memory) 1505, a CPU (Central Processing Unit) 1506, a communication I/F 1507, and an HDD (Hard Disk Drive) 1508, which are interconnected by a bus B.

The input device 1501 includes a keyboard, a mouse, and a touch panel, which are used by a user for inputting operation signals. The display device 1502 includes a display, etc., and displays processing results obtained by the computer system 1500.

The communication I/F 1507 is an interface for connecting the computer system 1500 to the networks N1 through N3.

Accordingly, the computer system 1500 can perform data communication via the communication I/F 1507.

The HDD 1508 is a nonvolatile storage device storing programs and data. Examples of stored programs and data are an OS (Operating System) which is basic software for controlling the entire computer system 1500, and application software for providing various functions on the OS.

The HDD 1508 manages the stored programs and data by a predetermined file system and/or a DB (database). The external I/F 1503 is an interface between the computer system 1500 and an external device. An example of the external device is a recording medium 1503*a*. Accordingly, the computer system 1500 can read data from and/or write data in the recording medium 1503*a* via the external I/F 1503. Examples of the recording medium 1503*a* are a flexible disk, a CD (Compact Disk), a DVD (Digital Versatile Disk), an SD memory card, and an USB memory (Universal Serial Bus memory).

The ROM 1505 is a nonvolatile semiconductor memory (storage device) that can hold programs and data even after the power is turned off. The ROM 1505 stores programs and data such as BIOS (Basic Input/Output System) that is executed when the computer system 1500 is activated, OS settings, and network settings. The RAM 1504 is a volatile semiconductor memory (storage device) for temporarily storing programs and data.

The CPU 1506 is a processor for loading the programs and data from storage devices such as the ROM 1505 and the HDD 1508 into the RAM 1504, and executing processes to control the entire computer system 1500 and to realize functions.

The client terminal 1011, the mobile terminal 1012, the access control device 1021, the print service providing device 1022, the scan service providing device 1023, and the other service providing device 1024 can realize various processes as described below, by the hardware configuration of the computer system 1500. Furthermore, the service providing device of the SaaS system, the service providing device of the common service system, and the storage device of the storage system can also realize various processes as described below, by the hardware configuration of the computer system 1500. Note that descriptions of hardware configurations of the image forming apparatus 1013 and the firewall FW illustrated in FIG. 1 are omitted.

<Software Configuration>
<<Service Providing System>>

Figure 4:
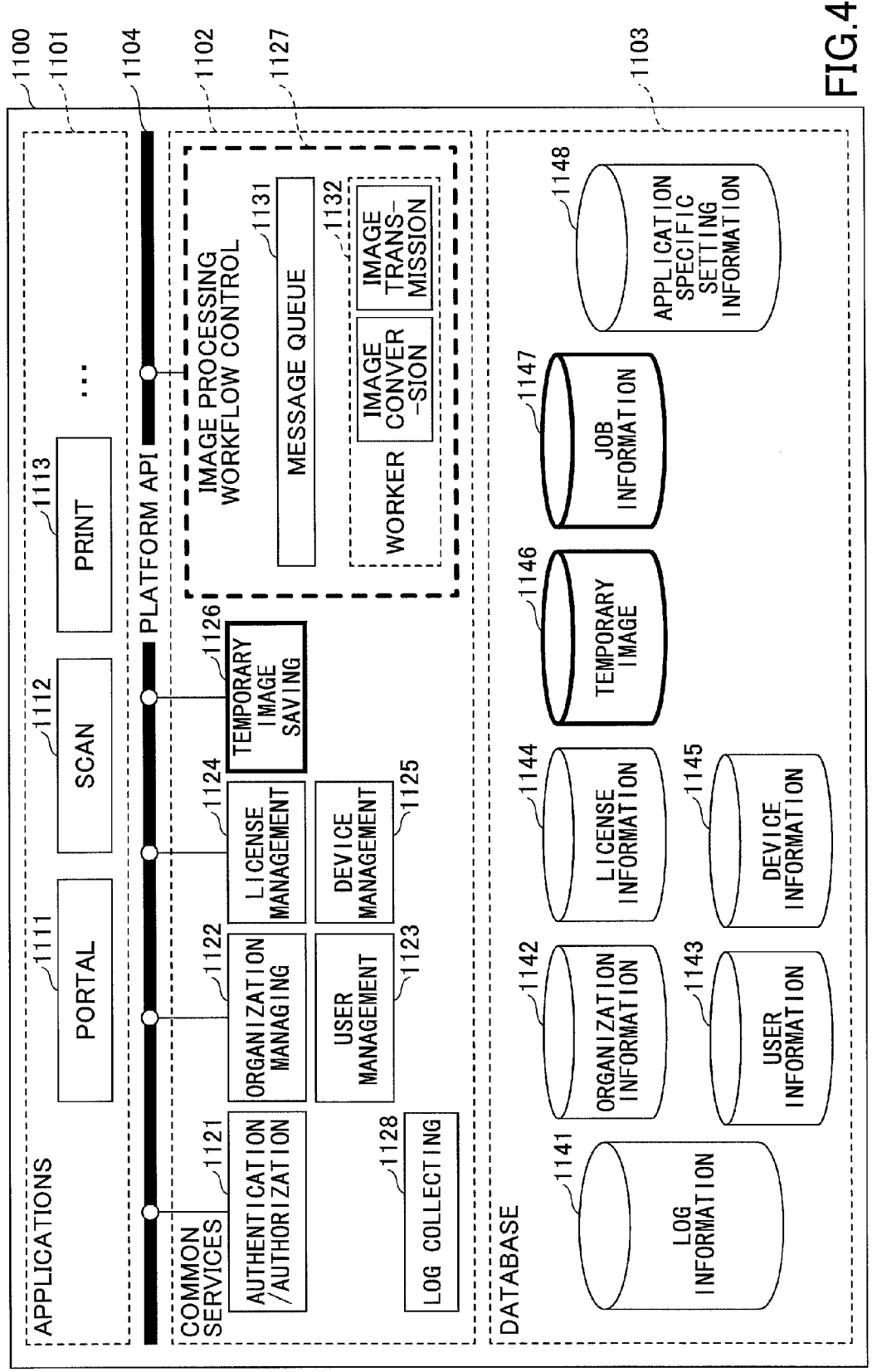
FIG. 4 is a process block diagram of an example of a service providing system according to the first embodiment.

The service providing system according to the first embodiment is realized by, for example, process blocks as illustrated in FIG. 4. FIG. 4 is a process block diagram of an example of the service providing system according to the first embodiment.

The service providing system 1100 realizes applications 1101, common services 1102, a database (DB) 1103, and a platform API (Application Programming Interface) 1104, by executing programs.

The applications 1101 include, for example, a portal service application 1111, a scan service application 1112, and a print service application 1113.

The portal service application 1111 is an application for providing a portal service. A portal service provides a service acting as an entrance for using the service providing system 1100. The scan service application 1112 is an application for providing a scan service. The print service application 1113 is an application for providing a print application. The applications 1101 may include other service applications.

The platform API 1104 is an interface for using the common services 1102 by the applications 1101, by the portal service application 1111, the scan service application 1112, and the print service application 1113. The platform API 1104 is an interface that is defined in advance, which is provided for the common services 1102 to receive requests from the applications 1101. The platform API 1104 is constituted by, for example, functions and classes.

The platform API 1104 is realized by, for example, a Web API that can be used via the network, when the service providing system 1100 is constituted by a plurality of information processing apparatuses.

The common services 1102 include an authentication/authorization unit 1121, an organization managing unit 1122, a user management unit 1123, a license management unit 1124, a device management unit 1125, a temporary image saving unit 1126, an image processing workflow control unit 1127, and a log collecting unit 1128.

Furthermore, the image processing workflow control unit 1127 includes a message queue 1131, and at least one worker 1132. The worker 1132 realizes functions such as image conversion and image transmission.

The authentication/authorization unit 1121 executes authentication/authorization based on a log in request from office devices such as the client terminal 1011 and the image forming apparatus 1013. The office device is a collective term of the client terminal 1011, the mobile terminal 1012, and the image forming apparatus 1013.

The authentication/authorization unit 1121 authenticates/authorizes a user by accessing, for example, a user information storage unit 1143 and a license information storage unit 1144 described below. Furthermore, the authentication/authorization unit 1121 authenticates, for example, the image forming apparatus 1013 by accessing, for example, the organization information storage unit 1142, and the device information storage unit 1145 described below.

The organization managing unit 1122 manages organization information stored in an organization information storage unit 1142 described below. The user management unit 1123 manages user information stored in the user information storage unit 1143 described below.

The license management unit 1124 manages license information stored in the license information storage unit 1144 described below. The device management unit 1125 manages device information stored in a device information storage unit 1145 described below. The temporary image preservation unit 1126 saves temporary images in a temporary image storage unit 1146 described below, and acquires temporary images from the temporary image storage unit 1146.

The image processing workflow control unit 1127 controls a workflow relevant to image processing, based on a request from the applications 1101. The message queue 1131 includes a queue corresponding to the type of process. The image processing workflow control unit 1127 submits the message of the request relevant to the process (job), in the queue corresponding to the type of the job.

The worker 1132 monitors the corresponding queue. When a message is submitted in the queue, the worker 1132 performs a process such as image conversion and image transmission according to the type of the corresponding job. Note that the submitted message may be subjectively read (pulled) by the worker 1132, or may be provided (pushed) from the queue to the worker 1132. The image processing workflow control unit 1127 will be described later in detail.

The database 1103 includes a log information storage unit 1141, an organization information storage unit 1142, a user information storage unit 1143, a license information storage unit 1144, a device information storage unit 1145, a temporary image storage unit 1146, a job information storage unit 1147, and an application-specific setting information storage unit 1148.

The log information storage unit 1141 stores log information. The organization information storage unit 1142 stores organization information described below. The user information storage unit 1143 stores user information described below. The license information storage unit 1144 stores license information. The device information storage unit 1145 stores device information described below.

The temporary image storage unit 1146 stores temporary images. A temporary image is, for example, a file or data of a scan image to be processed by the worker 1132. The job information storage unit 1147 stores information (job information) of a request relevant to a process (job). The application-specific setting information storage unit 1148 stores setting information specific to the application 1101.

The service providing system 1100 functions as an integrated base for providing common services such as a workflow relevant to authentication/authorization and image processing, and a group of services providing application services by using the function of the integrated base, such as a scan service, a print service, and a portal service. The integrated base is constituted with, for example, the common services 1102, the database 1103, and the platform API 1104. The group of services is constituted with, for example, the applications 1101.

Note that process blocks in the service providing system 1100 illustrated in FIG. 4 are classified as an example. It is not a mandatory requirement for the applications 1101, common services 1102 and DB 1103 to be classified in the hierarchy illustrated in FIG. 4. It is not limited to a specific classification such as the hierarchical relationship illustrated in FIG. 4, as long as processing for the service providing system 1100 can be executed according to the first embodiment.

FIG. 5 is a configuration diagram of an example of organization information. The organization information illustrated in FIG. 5 includes, as data items, an organization ID, an organization name, a country, a language, address information, and the like. The organization ID is information for identifying a group such as a company and a department. The organization ID is not limited to the word "organization", but it may be, for example, information for identifying a contract. Note that the organization ID is unique.

The organization name is a name of a group such as a company and a department. The country represents a name of a country in which a group such as a company and a department resides. The language represents a language used by a group such as a company and a department. The address information represents mail addresses of a group such as a company and a department.

FIG. 6 is a configuration diagram of an example of user information. The user information illustrated in FIG. 6 includes, as data items, an organization ID, a user name, a password, address information, and the like. The user name and password are information for identifying a user. Therefore, the user name may be a user ID or the like. Furthermore, a password is not mandatory. Note that the user name and password managed within a specific organization ID should be unique, but may not be unique across different organization IDs.

Furthermore, as the user name, information for identifying an electronic medium (for example, an IC card) held by a user may be used. As such an electronic medium held by a user, an IC card, a mobile phone, a tablet terminal, and an electronic book terminal may be used. As the information for identifying an electronic medium, a card ID, a serial ID, a telephone number of a mobile phone, and profile information of a terminal may be used. The information for identifying an electronic medium may be used in combination.

FIG. 7 is a configuration diagram of an example of device information. The device information in FIG. 7 includes, as data items, an organization ID, device authentication information, business office information, capability, and the like. The device authentication information is information for device authentication that determines whether an office device satisfies specific conditions. The device authentication information may be an ID that indicates a specific application is installed on the office device, or a device number that indicates it is a specific office device. The business office information represents, for example, a business office where the office device is installed. Capability represents, for example, capability of the office device.

<Processing Details>
<<Update of Worker 1132>>

The service providing system 1100 according to the first embodiment updates a worker 1132 in the service providing system 1100 in operation without influencing the service providing system 1100. The service providing system 1100 according to the first embodiment updates a worker 1132 as illustrated in FIG. 8.

Figure 8:
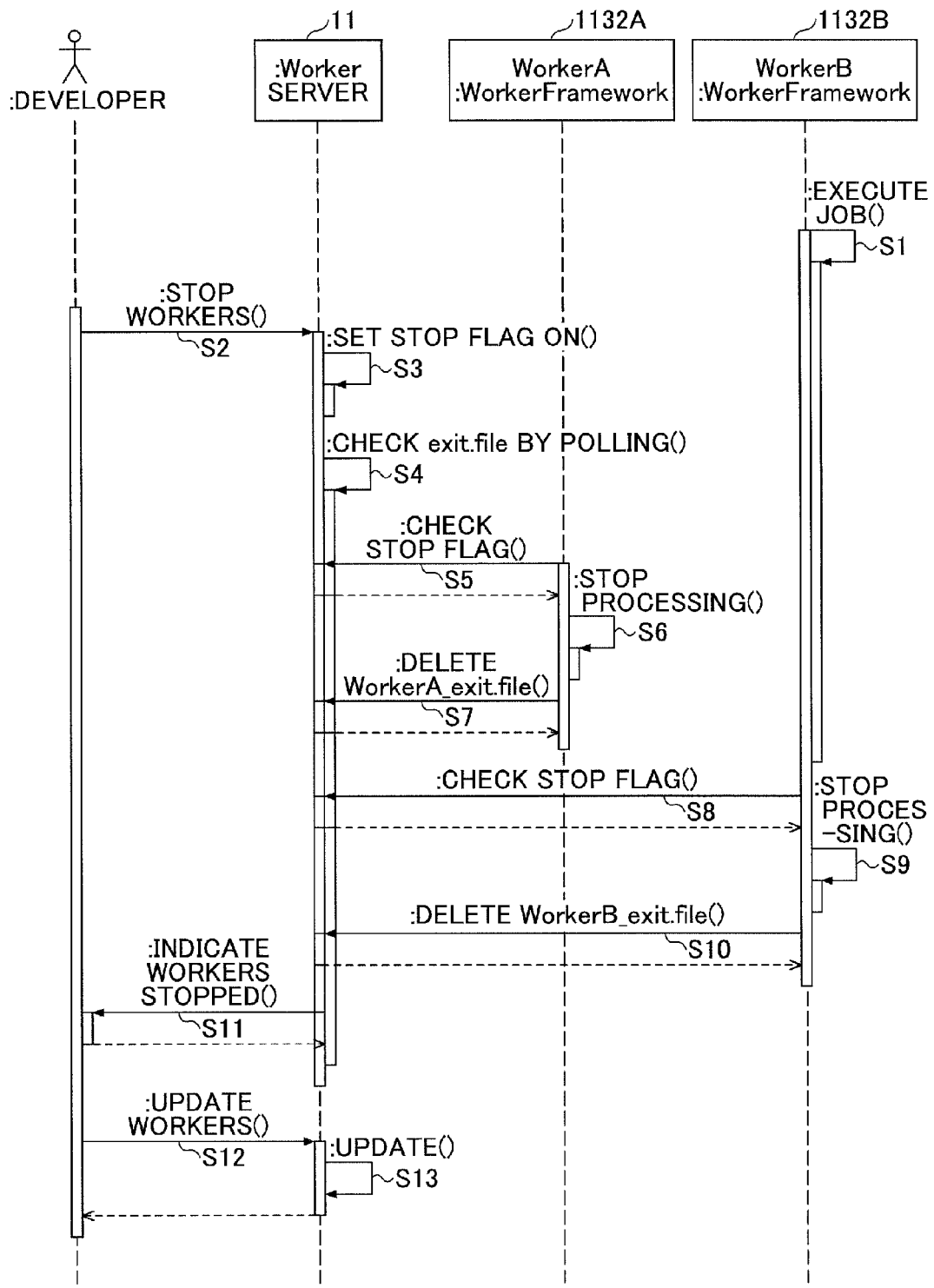
FIG. 8 is a sequence chart of an example of a procedure for updating workers.

FIG. 8 is a sequence chart of an example of a procedure for updating workers 1132. On a worker server 11 in FIG. 8, a worker 1132A and a worker 1132B are running. The worker server 11 is implemented with, for example, a Windows (trademark) server or a Linux (trademark) server.

The worker server 11 receives a command from a developer as an actor. The actor may be a person in charge of server maintenance or the like. The worker 1132A and worker 1132B in FIG. 8 include a worker framework 1133, which will be described later. The worker 1132A and worker 1132B are activated processes. The worker 1132A is a worker that does not processes a job. The worker 1132B is a worker that processes a job whose execution is started at Step S1.

At Step S2, the developer, as the actor, issues a command to stop the worker 1132A and worker 1132B. The stop command can be given by a command line or the like on a computer system in which the worker server 11 is running or a client terminal 1011 or a portable terminal 1012 that is connected with the computer system for data communication.

At Step S3, in response to receiving the stop command to stop the worker 1132A and worker 1132B from the developer, the worker server 11 sets stop flags of the worker 1132A and worker 1132B ON. Setting the stop flag ON can be done, for example, by creating a file having a predetermined name in a predetermined file storage location such as a folder.

For example, the worker server 11 may set the stop flag of the worker 1132A ON, by generating a file named "WorkerA_exit.file" in a predetermined folder. Also, the worker server 11 may set the stop flag of the worker 1132B ON, by generating a file named "WorkerB_exit.file" in a predetermined folder.

Note that the method of generating a file in a predetermined file storage location to determine whether the worker 1132A or worker 1132B is to be stopped is an example of a method to set the stop flag ON. It is not limited to the method of generating a file as long as it is possible to determine whether the worker 1132A or worker 1132B is to be stopped.

At Step S4, the worker server 11 checks whether an "exit.file" such as "WorkerA_exit.file" still exists or not in the predetermined file storage location at predetermined intervals (for example, every five minutes) to determine that every exit.file is deleted.

The worker server 11 determines that the stop flag is set ON if the "exit.file" exists in the predetermined file storage location. In FIG. 8, the worker server 11 determines the stop flags of the worker 1132A and worker 1132B are set ON.

At Step S5, the worker 1132A that does not process a job checks the stop flag of the worker server 11. Note that a function for checking the stop flag of the worker server 11 is implemented in the worker framework 1133.

The worker 1132A that does not process a job checks the stop flag at predetermined intervals (for example, every minute). If determining that the stop flag is set ON, the worker 1132A executes a stop procedure, which will be described later, at Step S6. Note that a function for stopping the worker 1132 is implemented in the worker framework 1133. If determining that the stop flag is OFF, the worker 1132A checks the stop flag of the worker server 11 again after the predetermined interval. At Step S7, the worker 1132A deletes "WorkerA_exit.file" in the predetermined file storage location of the worker server 11. After Step S7, the worker 1132A stops.

At Step S8, the worker 1132B that processes a job checks the stop flag at timing when the job processing is completed. If determining that the stop flag is set ON, the worker 1132B executes the stop procedure, which will be described later, at Step S9.

If determining that the stop flag is OFF, the worker 1132B checks the stop flag of the workers again after the predetermined interval, similarly to the worker 1132A. At Step S10, the worker 1132B deletes "WorkerB_exit.file" in the predetermined file storage location of the worker server 11. After Step S10, the worker 1132B stops.

If all "exit.files" are deleted in the predetermined file storage location, the worker server 11 determines that the worker 1132A and worker 1132B to be updated are stopped at Step S11. The worker server 11 indicates that all the workers 1132 to be updated are stopped to the developer, as the actor. The indication to the developer, as the actor, may be done by displaying a string on a command line or with a dialogue.

At Step S12, the developer, as the actor, directs to update the worker 1132A and worker 1132B to be updated. At Step S13, the worker server 11 rewrites programs of the worker 1132A, worker 1132B, and worker framework 1133 to update the worker 1132A and worker 1132B to be updated.

Note that at Step S13, the worker server 11 may rewrite both of the programs of the worker 1132 and worker framework 1133, or may rewrite one of the programs. Also, at Step S13, the worker server 11 may rewrite programs of a part of workers 1132 among multiple workers 1132. If updating a part of the workers 1132 among the multiple workers 1132, workers 1132 other than those to be updated may not be stopped.

In this way, the service providing system 1100 according to the first embodiment can stop the worker 1132B appropriately by waiting for the job is completed by the worker 1132B that has been processing the job.

Therefore, the service providing system 1100 according to the first embodiment can update the workers 1132 without causing an error in the job processed by the worker 1132B and without affecting the service providing system 1100 in operation.

Note that although the stop flag is implemented by creating a file in the predetermined file storage location in the sequence chart in FIG. 8, it can be implemented, for example, by a function for indicating ON/OFF of the stop flag in response to a query made by the worker 1132.

Figure 9:
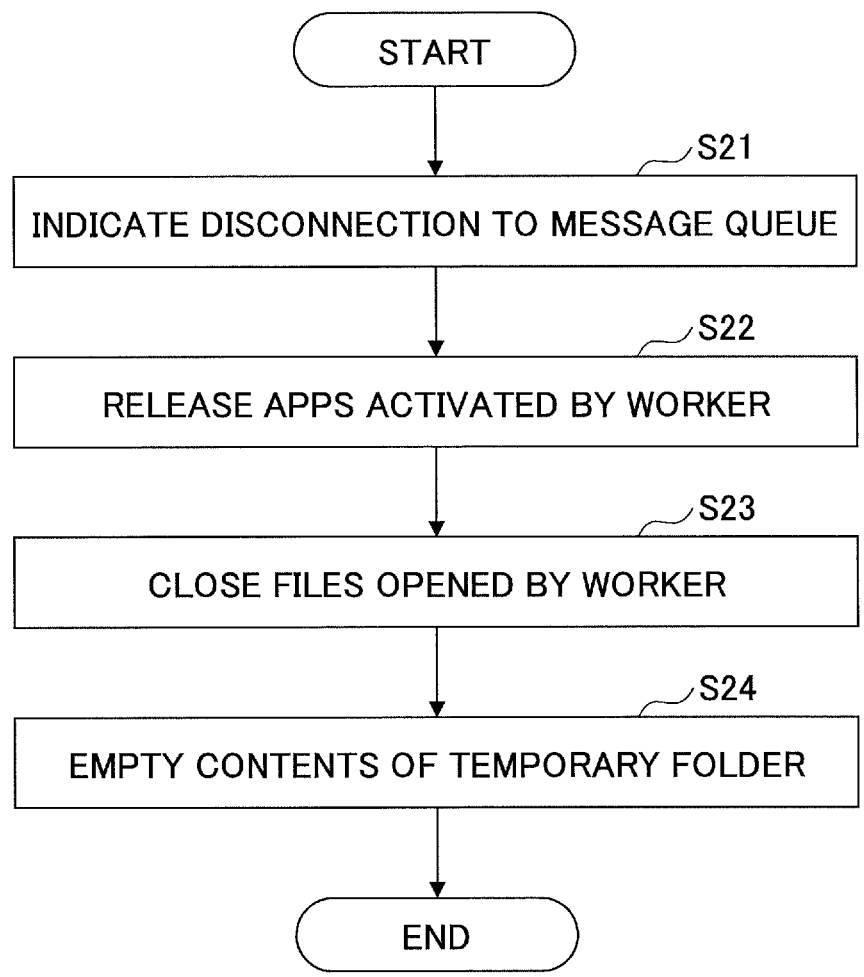
FIG. 9 is a flowchart of an example of a stop procedure of a worker.

FIG. 9 is a flowchart of an example of a stop procedure of a worker. The function of the stop procedure of the worker 1132 illustrated in FIG. 9 is implemented in the worker framework 1133.

At Step S21, the worker 1132 indicates disconnection to the message queue 1131. After the execution of Step S21, the message queue 1131 does not make a request for processing a job to the worker 1132 that is to be stopped. Note that if Step S21 is not executed, there is a likelihood that the message queue 1131 makes a request for processing a job to the worker 1132, which may be left unprocessed.

At Step S22, the worker 1132 releases activated applications required for processing if there are any. The applications activated by the worker 1132 may remain activated if Step S22 is not executed.

If an application remains activated having a file opened, it may lead to a problem in that the file cannot be opened by another application or applications cannot be activated at the same time. Also, it is left in a state where a user file remains open, which may cause a security problem.

At Step S23, the worker 1132 closes a file if the file has been opened. A file opened by the worker 1132 may remain open if Step S23 is not executed. If the file remains open, it may lead to a fault in that the file cannot be opened. Also, it is left in a state where a user file remains open, which may cause a security problem.

At Step S24, the worker 1132 empties a temporary folder. Files in the temporary folder may cause a fault in that the files remain forever if Step S24 is not executed. Also, if Step S24 is not executed, it causes a fault in that the files cannot be deleted in the temporary folder. Moreover, also, it is left in a state where a user file remains in the temporary folder, which may cause a security problem.

According to the stop procedure of the worker 1132 illustrated in the flowchart in FIG. 9, the worker 1132 can be stopped appropriately without causing the problems described above. Note that the stop procedure illustrated in FIG. 9 is an example, and it may be replaced with, for example, a procedure including at least a part of steps in FIG. 9.

<<Testing and Activation of Worker 1132>>

The service providing system 1100 according to the first embodiment can test and activate a worker 1132 in the service providing system 1100 in operation without affecting the service providing system 1100. The service providing system 1100 according to the first embodiment tests and activates the worker 1132 as illustrated in FIG. 10.

Figure 10:
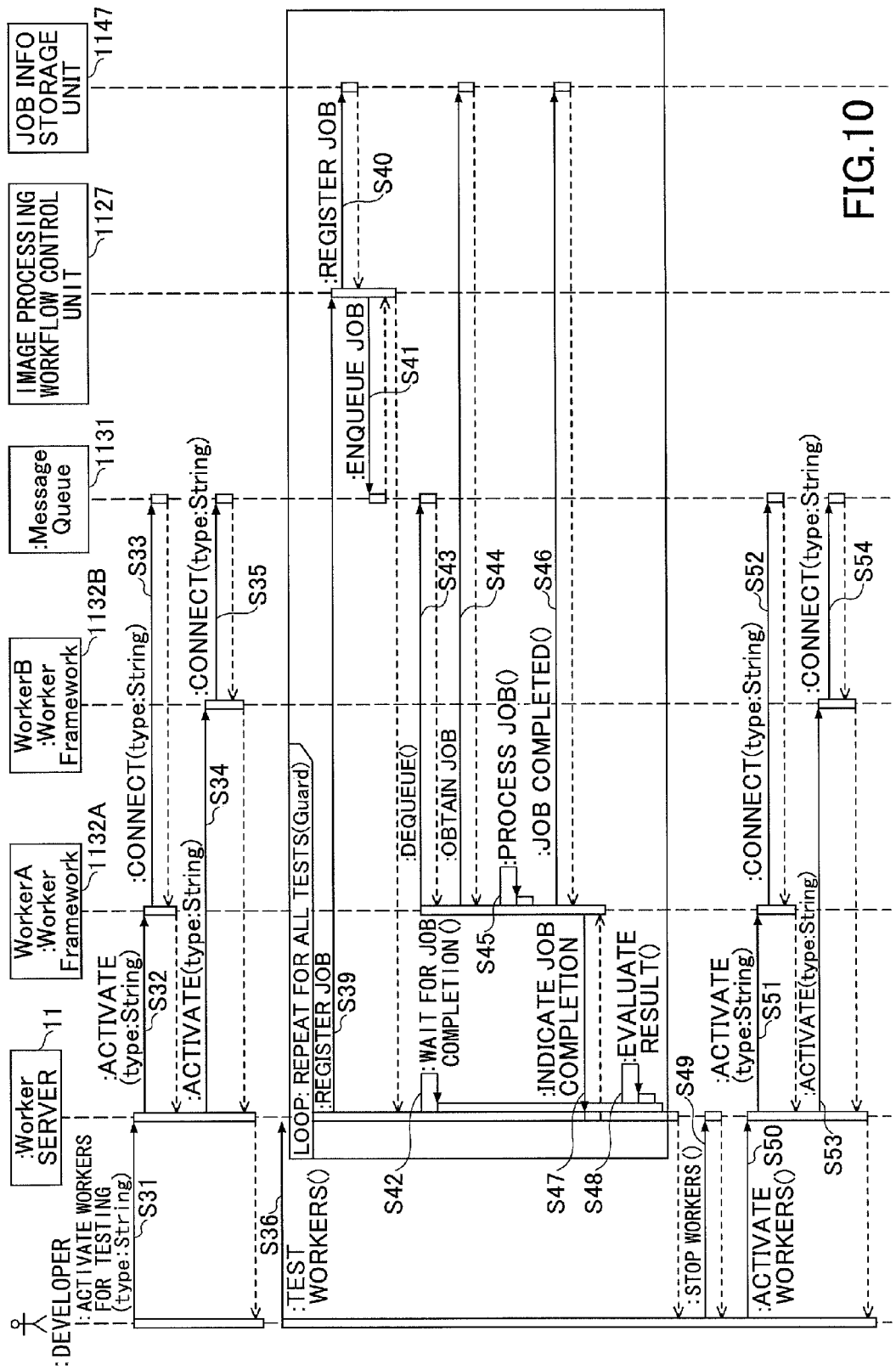
FIG. 10 is a sequence chart of an example of a procedure for testing and activating a worker.

FIG. 10 is a sequence chart of an example of the procedure for testing and activating workers. The worker server 11 illustrated in FIG. 10 is implemented with, for example, a Windows (trademark) server or a Linux (trademark) server, similarly to FIG. 8. The worker server 11 runs a test program, which will be described later.

Note that the worker server 11 is in a state before production use, and hence it can run the test program. Note that production use means a state where the worker 1132 running on the worker server 11 is activated so that it receives messages from a user queue (called a "normal queue", hereafter). The test program may be run on a test server provided separately from the worker server 11.

At Step S31, the developer, as the actor, directs the worker server 11 to activate the worker 1132A and worker 1132B updated by the procedure described with the sequence chart in FIG. 8. Note that an activation for testing means a state where the worker 1132A and worker 1132B running on the worker server 11 receive messages from a test queue (called a "dummy queue", hereafter) instead of the normal queue. The developer, as the actor, can specify whether to activate the worker 1132A and worker 1132B for production use or for testing, for example, by an argument when giving the direction to activate.

At Step S32, the worker server 11 specifies the dummy queue and activates the worker 1132A. At Step S33, the worker 1132A makes a request for connecting with the dummy queue to the message queue 1131. The message queue 1131 creates the dummy queue if it has not been created.

The message queue 1131 connects the worker 1132A with the dummy queue. After the execution of Step S33, the worker 1132A receives requests from the message queue 1131 for processing jobs related to messages entered into the dummy queue. Note that test jobs are registered into the dummy queue.

At Step S34, the worker server 11 specifies the dummy queue and activates the worker 1132A. At Step S35, the worker 1132B makes a request for connecting with the dummy queue to the message queue 1131.

The message queue 1131 connects the worker 1132B with the dummy queue. After the execution of Step S35, the worker 1132B receives requests from the message queue 1131 for processing jobs related to messages entered into the dummy queue.

Having the worker 1132A and worker 1132B activated, the developer, as the actor, directs the test program of the worker server 11 to test the worker 1132A and worker 1132B at Step S36. Note that Steps S40-S48, which will be described later, are repeated for the number of tests.

At Step S39, the test program of the worker server 11 makes a request for registering job information to the image processing workflow control unit 1127 with specifying the dummy queue, which is used for testing as a type of processing. Note that the job information received from the test program includes items, for example, illustrated in FIG. 11.

FIG. 11 is a configuration diagram of an example of the job information. The job information in FIG. 11 includes a part 1 defining a job and a part 2 defining a task. The part 1 defining a job includes a job ID, a user ID, an organization ID, an application ID, a URL for callback, cookie information required for the callback, and the like. Also, the part 2 defining a task includes a task ID, a parent job ID, a type, parameters (Params), and the like.

The job ID is information for identifying a job. The task ID is information for identifying a task. The parent job ID is provided for making a correspondence between a task and a job, which is the same as the job ID in the part 1 defining the job. Note that job information received by the image processing workflow control unit 1127 has the job ID, task ID and parent job ID not specified.

The type represents a type of a procedure executed by the worker 1132, which is set depending on a function of the procedure. Note that in FIG. 11, The type is set to "dummy_queue" that represents testing.

The parameters (Params) are parameters that are required for an execution by the worker 1132. In FIG. 11, a folder ID, a filename, an organization ID, a federation ID, and a file are set as the parameters that are required for an execution of a procedure for preserving a file into the online storage 1031.

The folder ID represents a folder in which a file is preserved. The filename represents the name of a file used when preserving the file. The organization ID and federation ID represent information for obtaining a token for connecting with the online storage 1031 from the authentication/authorization unit 1121. The file represents information for designating the original location of a file to be preserved into the online storage 1031. For example, the file is set to a URI that designates the storage location where a file of a scan image preserved in the temporary image storage unit 1146.

Note that the parameters (Params) depend on the type of a procedure executed by the worker 1132. The parameters (Params) are specific to the type of a procedure executed by the worker 1132.

The user ID is information representing a user that makes a request for executing a job. The organization ID is information representing an organization that makes a request for executing a job. The application ID is information representing a request source that makes a request for executing a job such as the application 1101. The URL for callback is information representing a callback destination. The cookie information required for the callback is the information used when making a callback to the request source.

At Step S40, the image processing workflow control unit 1127 registers job information of the test job to which a registration request has been made into the job information storage unit 1147. The job information storage unit 1147 issues a job ID and a task ID of the registered job. The job information storage unit 1147 appends the issued job ID and task ID to the job ID, task ID and parent job ID in the job information. Next, the job information storage unit 1147 returns the job ID of the test job registered in the job information to the image processing workflow control unit 1127.

At Step S41, the image processing workflow control unit 1127 analyzes whether it is a test job based on the type included in the job information. The image processing workflow control unit 1127 enqueues a request message related to the test job into the dummy queue of the message queue 1131. Note that the message includes the job ID.

The image processing workflow control unit 1127 returns the job ID of the test job to the test program as a result of the job registration. At Step S42, the test program of the worker server 11 waits for the completion of the test job.

The worker framework 1133 of the worker 1132A monitors the dummy queue of the message queue 1131. The worker framework 1133 of the worker 1132A obtains the message registered into the dummy queue at Step S43.

At Step S44, the worker framework 1133 obtains the job information of the job ID included in the obtained message from the job information storage unit 1147. At Step S45, the worker framework 1133 directs to execute the test job to the worker 1132A following the job information. The worker 1132A processes the job following the direction to execute the job from the worker framework 1133.

Also, at Step S46, the worker framework 1133 of the worker 1132A indicates the completion of the test job to the job information storage unit 1147. The job information storage unit 1147 updates, for example, status information of the test job that has been completed.

At Step S47, the worker framework 1133 indicates the completion of the job to the test program of the worker server 11 that is registered as the callback destination, which is included in the part 1 relating to the definition of a job in the job information. Note that if the cookie information required for the callback is set in the part 1 relating to the definition of a job in the job information, the worker framework 1133 can add the cookie information to the callback.

Next, at Step S48, the test program evaluates the result of the job executed by the worker 1132A as will be described later. The test of the worker 1132B is substantially the same as the test of the worker 1132A, and its description is omitted.

At Step S49, the developer, as the actor, directs to stop the worker 1132A and worker 1132B. The procedure for stopping the worker 1132A and worker 1132B is the same as the sequence chart in FIG. 8, and its description is omitted.

Having received the result of the test job, if there are no problems, the developer, as the actor, directs the worker server 11 to activate the worker 1132A and worker 1132B for production use that have been updated by the procedure of the sequence chart in FIG. 8, at Step S50. At Step S51, the worker server 11 activates the worker 1132A with specifying the normal queue. At Step S52, the worker 1132A makes a request for connecting with the normal queue to the message queue 1131. The message queue 1131 newly creates the normal queue if not exits. The message queue 1131 connects the worker 1132A with the normal queue.

After the execution of Step S35, the worker 1132A receives requests from the message queue 1131 for processing jobs related to messages entered into the normal queue. Similarly to the worker 1132A, the worker 1132B receives requests from the message queue 1131 for processing jobs related to messages entered into the normal queue.

Note that although the example in FIG. 10 is described in which the worker 1132A and worker 1132B that have been updated by the procedure of the sequence chart in FIG. 8 are tested before activation, it is substantially the same for the worker 1132A and worker 1132B, which have been added are tested before activation.

Evaluation executed by the test program at Step S48 uses, for example, an indication of the job completion as illustrated in FIGS. 12-13.

FIGS. 12-13 illustrate a configuration diagram of an example of an indication of job completion. The indication of job completion illustrated in FIGS. 12-13 originates from job information, for example, illustrated in FIG. 14.

FIG. 14 is a configuration diagram of another example of job information. The job information in FIG. 14 illustrates an example of a procedure for applying OCR (Optical Character Reader) to a scan image, which is then preserved into the online storage 1031. In FIG. 14, a job ID, a task ID and a parent job ID are omitted because they are empty.

The job information in FIG. 14 includes a part 1 defining a job and a part 2 defining a task, similarly to job information in FIG. 11. The part 1 defining a job is similar to the job information in FIG. 11, which is added with reserved elements that makes it possible to have arbitrary parameters in future.

Also, the part 2 defining a task is similar to the job information in FIG. 11, although it defines two tasks. The first task is an example of the procedure for applying OCR to a scan image. The second task is an example of the procedure for preserving a generated file into the online storage 1031.

The parameters (Params) included in the definition of the first task are parameters specific to the procedure for applying OCR to a scan image. The parameters specific to the procedure for applying OCR to a scan image include setting of file format after OCR, setting of language with which OCR is applied, setting of an image size of the file after OCR, and the like.

The parameters (Params) included in the definition of the second task are parameters specific to the procedure for preserving a generated file into the online storage 1031. The parameters specific to the procedure for preserving a generated file into the online storage 1031 include an URL that designates the storage location of a file stored in the online storage 1031. In the example in FIG. 14, the URL that designates the storage location of a file stored in the online storage 1031 is set to $1, which indicates that a result of the first task is to be used.

The parameters specific to the procedure for preserving a generated file into the online storage 1031 also include setting of a folder in which the file is preserved, setting for obtaining a token to connect with the online storage 1031 from the authentication/authorization unit 1121.

Also, the indication of the job completion illustrated in FIG. 12 and FIG. 13 includes a part 1 defining a job, a part 2 defining tasks, and a part 3 defining execution results of the task.

The part 1 defining a job includes a job ID, an application ID, an organization ID, a user ID, a status, error information, created date and time of the job, updated date and time of the job, a URL for callback, cookie information required for the callback, reserved elements, and the like. The status is a status of the job, which is set to "received", "processing", "completed", "error", or the like. The error information is set to information that indicates which type of an error occurs if the status indicates an error.

The part 2 defining tasks include the part 2 defining a task in FIG. 14, and additional items of a task ID and a parent job ID. The part 3 defining execution results of the task enumerates results of an execution of two tasks defined in the part 2 defining tasks.

The definition of execution results of the first task includes the definition of the first task that is set in the part 2 defining tasks in FIG. 12, error information, details of execution results, started date and time of the task, and the completion date and time of the task.

Details of the execution results include, for example for the procedure for applying OCR to a scan image, the URL that indicates the storage location of the file after execution, the size of the file after execution, and the like. Also, detailed information of execution commonly provided across functions includes elapsed time for the task as a whole (worker framework 1133 and worker 1132), elapsed time used by the engine (worker 1132), and the like.

The definition of execution results of the second task includes the definition of the second task that is set in the part 2 defining tasks in FIG. 12, error information, details of the execution results, started date and time of the task, and the completion date and time of the task. Details of the execution results include, for example for the procedure for preserving a generated file into the online storage 1031, a name of the preserved file, a file ID issued by the online storage 1031, an URL that designates the storage location of the preserved file, and the like. Also, detailed information of execution commonly provided across functions includes elapsed time for the task as a whole (worker framework 1133 and worker 1132), elapsed time used by the engine (worker 1132), and the like, which are similar to the first task.

At Step S48, the test program evaluates the job result executed by the worker 1132 using the indication of the job completion illustrated in FIGS. 12-13 and a correspondence table describing correspondences between functions, input values, and expected values as illustrated in FIG. 15. FIG. 15 is a schematic view illustrating an example of the correspondence table used for evaluating a job result by a worker.

The correspondence table in FIG. 15 describes correspondences between functions of the worker 1132, input values for executing the functions of the worker 1132, and expected values of execution results included in the indication of the job completion. The test program reads expected values of execution results from the correspondence table in FIG. 15 based on the function set to the type and an indication of the job completion and the input values set as parameters (Params).

Next, the test program compares the execution results included in the indication of the job completion with the expected values read from the correspondence table in FIG.

15 to evaluate the job result by the worker 1132. For example, if the execution results included in the indication of the job completion are equivalent to the expected values read from the correspondence table in FIG. 15, the test program determines that the job result by the worker 1132 is normal.

<<Automated Update, Testing, and Activation of Worker 1132>>

Figure 16:
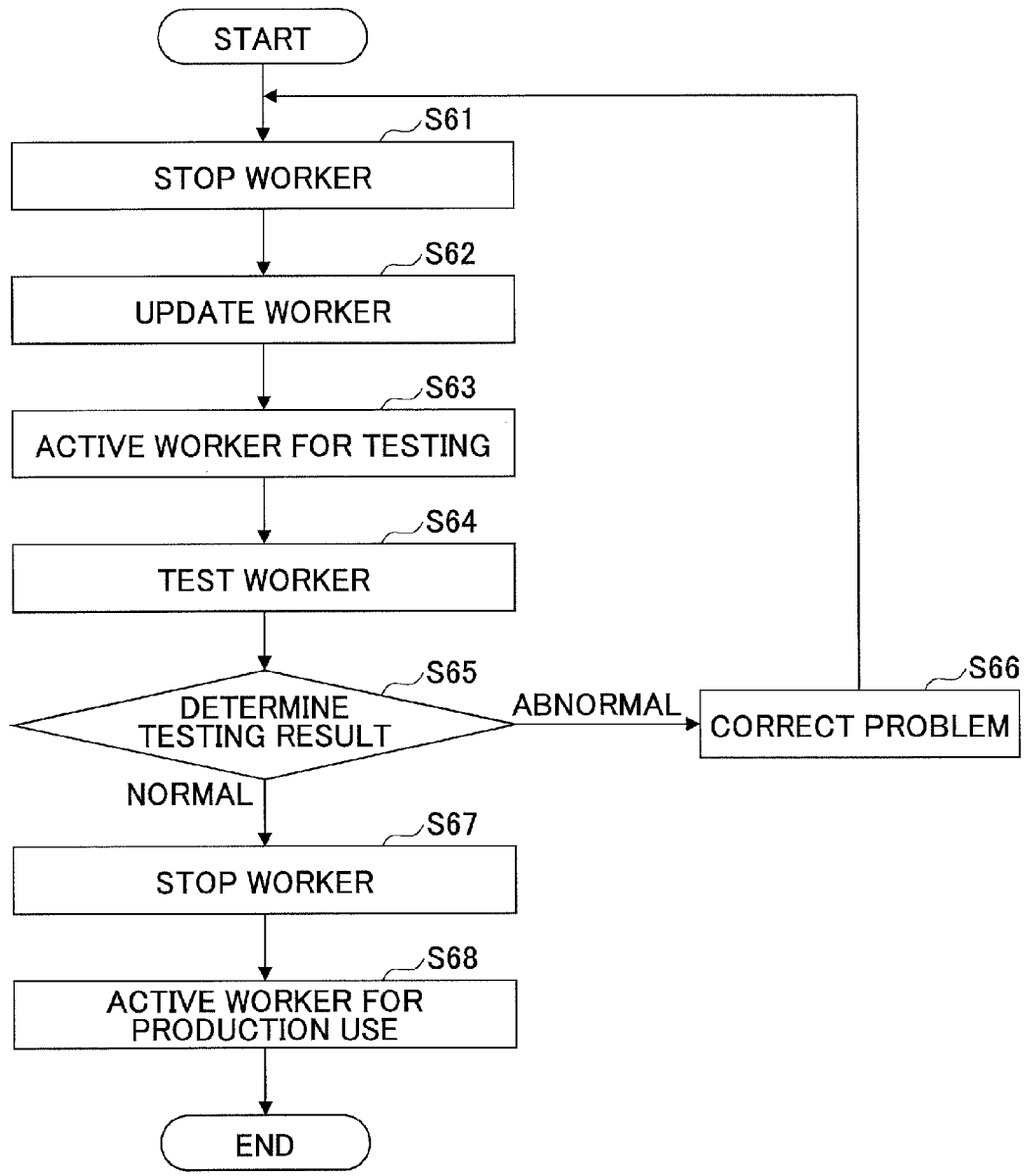
FIG. 16 is a flowchart of an example of operational steps of a developer when updating, testing, and activating a worker.

FIG. 16 is a flowchart of an example of operational steps of a developer when updating, testing, and activating a worker.

At Step S61, the developer directs the worker server 11 to stop. When the worker 1132 stops, the developer directs the worker server 11 to update the worker 1132. At Step S63, the developer directs the worker server 11 to activate the worker 1132 that has been confirmed having no problems with the result of the test job. After activating the worker 1132 for testing, at Step S64, the developer directs the test program of the worker server 11 to test the worker 1132 activated for testing.

At Step S65, the developer determines the result of the job, and if determining it is abnormal, the problem is corrected at Step S66, and the procedure goes back to Step S61. If the result of the test job is normal, the developer directs the workers server 11 to stop the worker 1132 that has been activated for testing at Step S67. Next, at Step S68, the developer performs an instruction to activate the worker 1132 for production use that has been confirmed having no problems by the result of test job.

The operational steps for updating, testing, and activating a worker 1132 by the developer can be automated by executing the test program of the worker server 11 with batch processing. If the test program is executed with batch processing, it is possible to consider, for example, that the worker 1132 is switched back to the one before update as a correction of a problem at Step S66. Also, if the test program is executed with batch processing, instead of correcting a problem at Step S66, abnormality may be indicated to the developer to terminate the procedure in FIG. 16.

<<Asynchronous Processing>>

Figure 17:
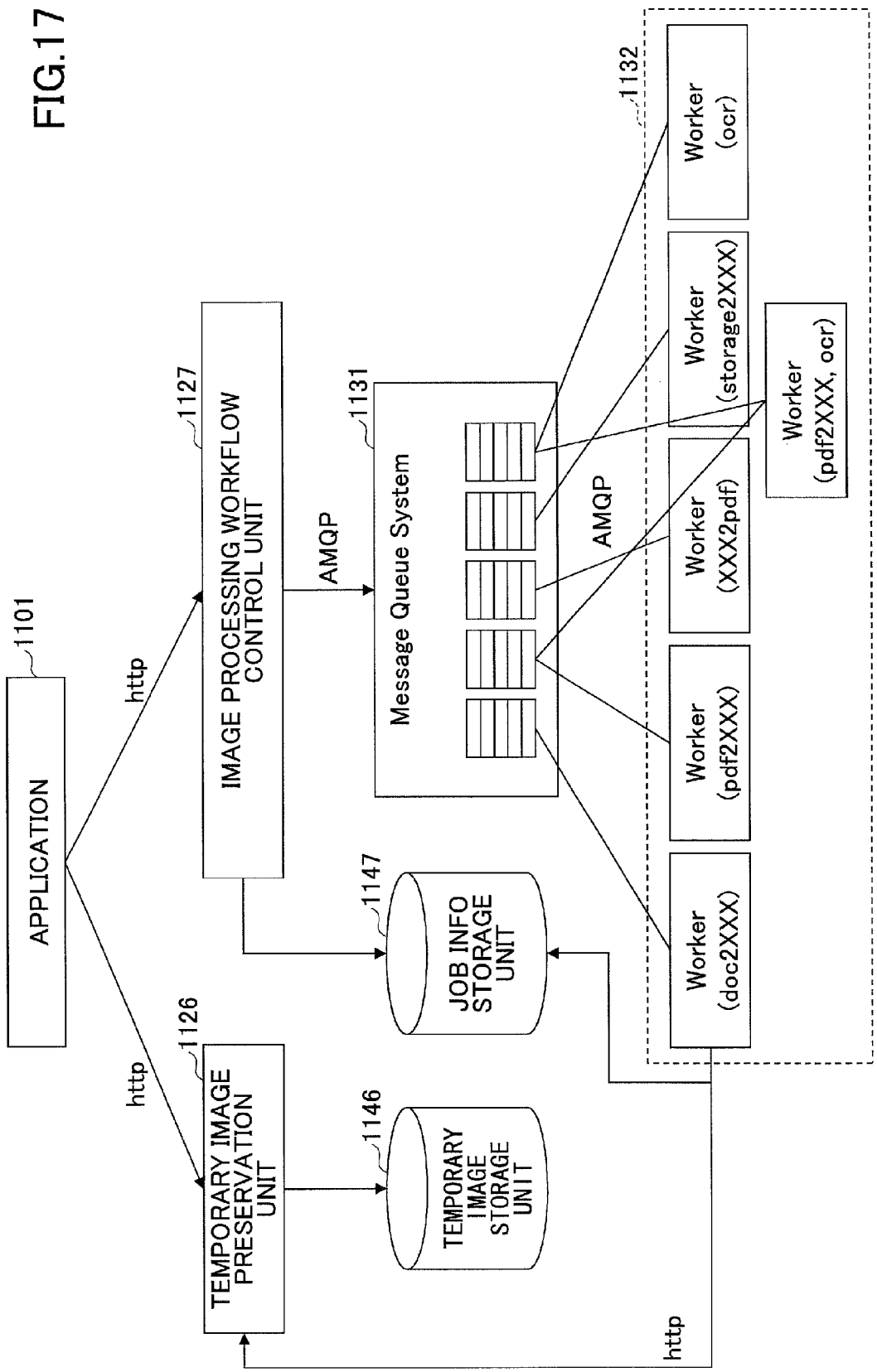
FIG. 17 is a schematic view illustrating an example of asynchronous processing by a service providing system.

Asynchronous processing by the service providing system 1100 illustrated in FIG. 4 will be described in detail. FIG. 17 is a schematic view illustrating an example of asynchronous processing by the service providing system 1100.

FIG. 17 illustrates the application 1101, the temporary image preserving unit 1126, the image processing workflow control unit 1127, the message queue 1131, and the worker 1132 among the process blocks of the service providing system 1100 illustrated in FIG. 4.

The application 1101 makes a request for preserving a file of a scan image uploaded from the image forming apparatus 1013 to the temporary image preserving unit 1126. The temporary image preserving unit 1126 preserves the file of the scan image into the temporary image storage unit 1146, and returns a URI that designates the storage location of the file to the scan service application 1112. The application 1101 makes a request for registering job information to the image processing workflow control unit 1127. The image processing workflow control unit 1127 registers the job information to the job information storage unit 1147. The job information storage unit 1147 issues a job ID of the job whose job information has been registered, and returns the job ID to the image processing workflow control unit 1127.

The image processing workflow control unit 1127 analyzes the type of processing from the type included in the job information. The image processing workflow control unit 1127 enqueues the message of the request related to the job into a queue of the message queue 1131 that coincides with the type of processing. The image processing workflow control unit 1127 analyzes the type of required processing, and executes control for performing asynchronous processing.

The message queue 1131 includes multiple queues that correspond to types of processing. In FIG. 17, a line connects a worker 1132 with a queue processed by the worker 1132. As illustrated in FIG. 17, a worker 1132 may process one or more queues. Also as illustrated in FIG. 17, a queue may be processed by one or more workers 1132.

For example, in FIG. 17, types processed by workers 1132 include "doc2XXX", "pdf2XXX", "XXX2pdf", "storage2XXX", "ocr", and "pdf2XXX, ocr". A worker 1132 that processes the type "pdf2XXX, ocr" is an example of the worker 1132 that processes multiple types.

The worker framework 1133 that monitors the queues of the message queue 1131 detects the message of the request related to the job entered into the queue. The worker framework 1133 obtains the message registered into the queue. The worker framework 1133 is not illustrated in FIG. 17.

The worker framework 1133 obtains job information of the job ID included in the obtained message from the job information storage unit 1147. The worker framework 1133 reads a URI that designates the storage location of the file of the scan image preserved in the temporary image storage unit 1146.

Next, the worker framework 1133 obtains the file of the scan image from the temporary image storage unit 1146 by specifying the URI that designates the storage location of the file of the scan image preserved in the temporary image storage unit 1146.

The worker framework 1133 analyzes the type of processing from the obtained job information, and directs the worker 1132 that has the coincident type of processing to execute the job. The worker 1132 that completes to execute the job returns an execution result of the job to the worker framework 1133.

The worker framework 1133 indicates the job completion to the job information storage unit 1147, to update the status information of the completed job. Also, the worker framework 1133 reads the URI for callback from the job information, to indicate the job completion to the URL for callback.

Figure 18:
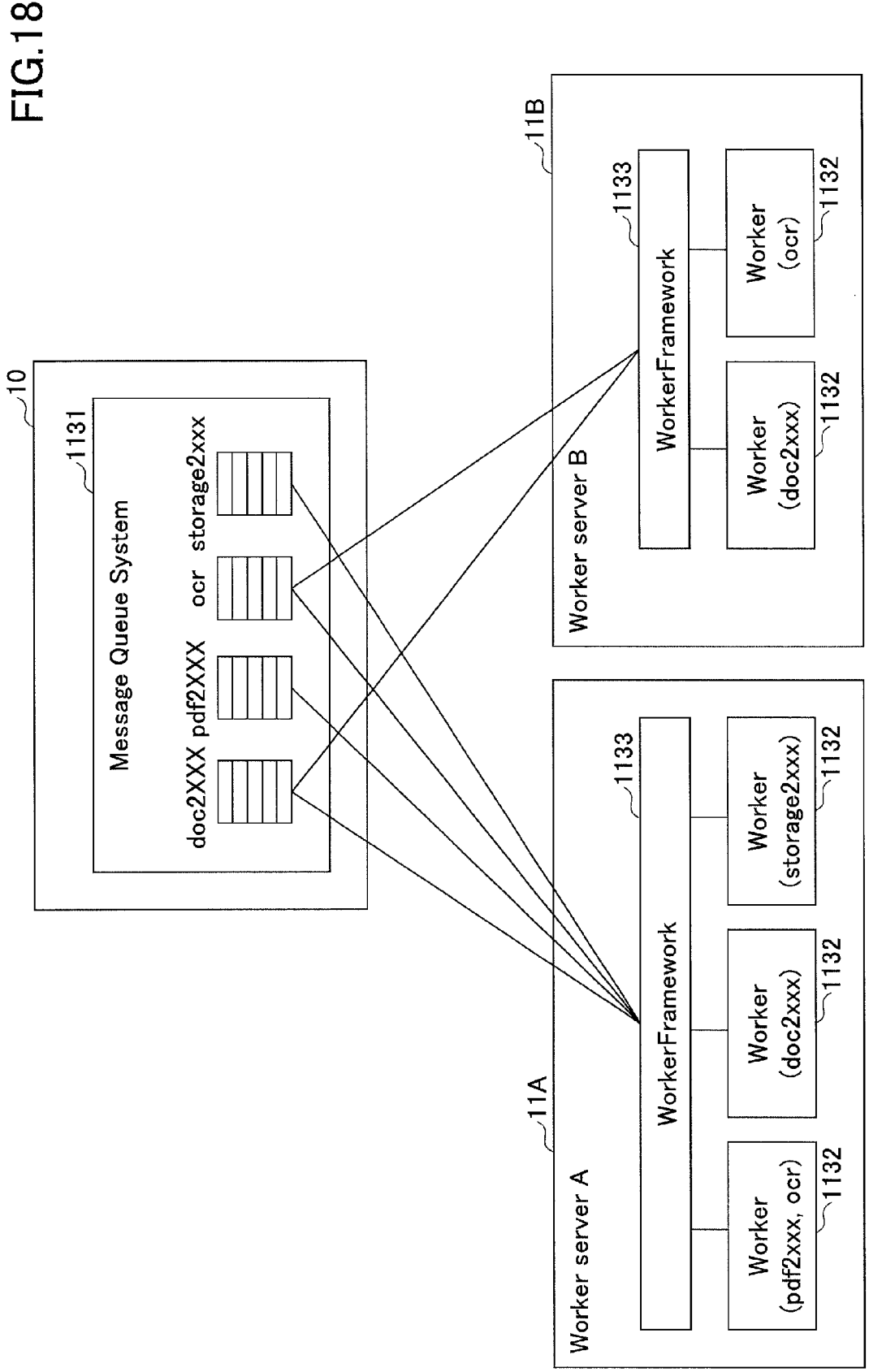
FIG. 18 is a schematic view illustrating a relationship among a queue, a worker, and a worker framework.

The relationship between a queue in the message queue 1131, a worker 1132, and a worker framework 1133 can be represented, for example, as illustrated in FIG. 18.

FIG. 18 is a schematic view illustrating the relationship between a queue, a worker, and a worker framework. The message queue 1131 includes multiple queues. The queues are separated by types of processing (functions) such as "doc2XXX". The message queue 1131 operates, for example, on a single server 10.

Also, the worker 1132 and worker framework 1133 operate on the worker servers 11A-11B. The worker servers 11A-11B are implemented with, for example, a Windows (trademark) server or a Linux (trademark) server.

For example, the worker servers 11A-11B, which may be Windows (trademark) servers, have two workers 1132 operate. Also, the worker servers 11A-11B, which may be Linux (trademark) servers, have three workers 1132 operate. As illustrated in FIG. 18, the worker servers 11A-11B are loaded with the worker framework 1133 and multiple workers 1132.

As illustrated in FIG. 18, the worker framework 1133 can execute polling on multiple queues by a single connection. However, a range of multiple queues for polling by the single connection is set to the range of the workers 1132 operating on the same OS server.

With the relationship among the queues in the message queue 1131, the workers 1132, and the worker frameworks 1133 as illustrated in FIG. 18, the service providing system 1100 can implement asynchronous processing. Note that a relationship between a queue in the message queue 1131, a worker 1132, and a worker framework 1133 when updating, testing, and activating the worker 1132 can be represented, for example, as illustrated in FIG. 19.

Figure 19:
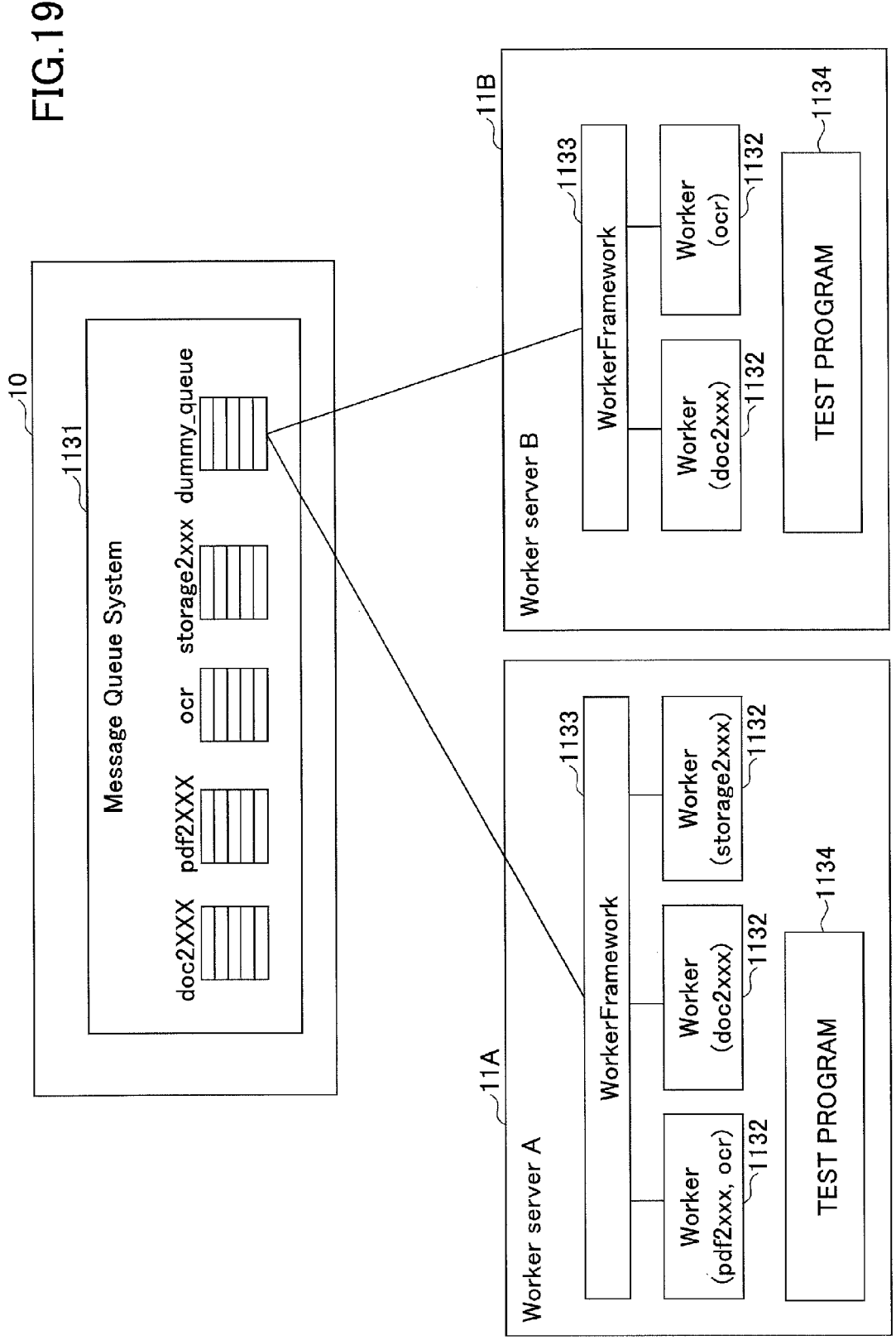
FIG. 19 is a schematic view illustrating a relationship among a queue, a worker, and a worker framework when updating, testing, and activating the worker.

FIG. 19 is a schematic view illustrating the relationship between a queue, a worker, and a worker framework when updating, testing, and activating the worker. The message queue 1131 has the configuration of the message queue 1131 in FIG. 18 added with a dummy queue.

Also, the worker servers 11A-11B have the configuration of the worker servers 11A-11B in FIG. 18 added with the test program. The worker servers 11A-11B in FIG. 19 activate the workers 1132 for testing. Therefore, in FIG. 19, a line connecting the worker framework 1133 with the dummy queue represents that the worker 1132 processes the dummy queue.

With the relationship between the dummy queue of the message queue 1131, the worker 1132, the worker framework 1133, and the test program 1134 as illustrated in FIG. 19, the service providing system 1100 can implement the procedure of the sequence chart illustrated in FIG. 8 and FIG. 10.

(Overview)

With the service providing system 1100 according to the first embodiment, it is possible to update or add, test and activate a worker 1132 in the service providing system 1100 in operation without affecting the service providing system 1100.

Also, with the service providing system 1100 according to the first embodiment, a mechanism can be implemented in which a dummy queue can be added dynamically, and a queue processed by a worker 1132 can be changed dynamically.

With the service providing system 1100 according to the first embodiment, by using a dummy queue, it is possible to confirm operations of the workers 1132 in the service providing system 1100 in operation. In addition, with the service providing system 1100 according to the first embodiment, a worker 1132 that has been confirmed for the operations can be activated for production use.

Namely, with the service providing system 1100 according to the first embodiment, workers 1132 to be updated are stopped and separated one by one among the multiple workers 1132 within a redundant configuration, which may be switched back to the redundant configuration after having confirmed the operations of the workers 1132 after update.

Moreover, with the service providing system 1100 according to the first embodiment, a worker 1132 to be updated can be stopped appropriately after the worker 1132 has completed a job.

The present invention is not limited to the specific embodiments described herein, but variations and modifications may be made without departing from the spirit and scope of the present invention. Note that a first preservation unit in claims corresponds, for example, to a message queue 1131. An execution unit corresponds, for example, to a worker 1132. An execution control unit corresponds, for example, to a worker framework 1133. A second preservation unit corresponds, for example, to a predetermined folder where a stop flag is implemented.

Execution request information corresponds, for example, to job information. An activation unit corresponds to the operation of Step S32 of a worker server 11. A registration unit corresponds to the operation of Step S39 of a worker server 11. An evaluation unit corresponds to the operation of Step S48 of a worker server 11.

The present application is based on and claims the benefit of priority of Japanese Priority Patent Application No. 2013-021263, filed on Feb. 6, 2013, the entire contents of which are hereby incorporated herein by reference.

What is claimed is:

1. An information processing apparatus comprising:
a memory configured to store a program; and
a processor configured to execute the program that causes the information processing apparatus perform functions as:
  a first preservation unit configured to preserve execution request information for information processing;
  an execution unit configured to execute one or more types of the information processing;
  an execution control unit configured to have the execution unit being capable of executing one of the types of the information processing execute the information processing of the execution request information preserved by the first preservation unit; and
  a second preservation unit configured to preserve a stop command of the execution unit;
wherein, if the execution unit does not execute the information processing, the execution control unit checks the second preservation unit at predetermined intervals if the second preservation unit preserves the stop command to have the execution unit execute a stop procedure, and if the execution unit executes the information processing, the execution control unit checks the second preservation unit after the information processing has been completed,
wherein the execution unit is configured to stop the execution unit according to the stop command and subsequently delete a file indicating the stop command of the execution unit from a predetermined file storage location provided in a worker server;
wherein the worker server is external to the information processing apparatus, and
wherein the worker server notifies a user of the information processing apparatus that creates the stop command in the second preservation unit of a stop of the execution unit after the file is deleted.

2. The information processing apparatus as claimed in claim 1, wherein the stop procedure stops the execution unit after at least one of procedures has been executed, the procedures including a procedure for releasing a program activated by the execution unit, a procedure for closing a file opened by the execution unit, and a procedure for deleting a file in a file storage location temporarily used by the execution unit.

3. The information processing apparatus as claimed in claim 1, wherein the second preservation unit preserves the stop command of the execution unit directed by a user.

4. The information processing apparatus as claimed in claim 1, further comprising:
an activation unit configured to activate the execution unit for testing,
wherein the execution control unit obtains the execution request information for testing from a preservation trait for testing configured to preserve the execution request information for testing included in the first preservation unit, then has the execution unit for testing execute the information processing for the execution request information for testing.

5. The information processing apparatus as claimed in claim 4, further comprising:
a registration unit configured to register the execution request information for testing into the preservation unit for testing; and
an evaluation unit configured to evaluate a result of the information processing for the execution request information for testing executed by the execution unit for testing.

6. The information processing apparatus as claimed in claim 5, wherein, having obtained the result of the information processing for the execution request information for testing from the execution unit for testing, the execution control unit indicates the result of the information processing for the execution request information for testing to the evaluation unit being specified as an indication destination in the execution request information for testing.

7. The information processing apparatus as claimed in claim 6, wherein in response to a command from a user for activation the execution unit for testing, the activation unit, the registration unit and the evaluation unit automatically execute procedures including a procedure for activating the execution unit for testing, a procedure for registering the execution request information for testing into the preservation unit for testing, a procedure for having the execution unit for testing execute the information processing for the execution request information, a procedure for evaluating a result of the information processing for the execution request information for testing executed by the execution unit for testing.

8. The information processing apparatus as claimed in claim 1, further comprising a plurality of execution control units,
 wherein if any one of the execution units does not execute the information processing, the any one of the execution units checks the second preservation unit at the predetermined intervals, or if any one of the execution units executes the information processing, the any one of the execution units checks the second preservation unit after the information processing has been completed,
 wherein each of the execution units is configured to stop the execution unit according to the stop command and subsequently delete the file indicating the stop command of the execution unit from the predetermined file storage location provided in the worker server, and
 wherein the worker server notifies the user of the stop of the execution unit after the file is deleted.

9. An information processing system including one or more information processing apparatus, the information processing system comprising:
 a memory configured to store a program; and
 a processor configured to execute the program that causes the information processing system perform functions as:
  a first preservation unit configured to preserve execution request information for information processing;
  an execution unit configured to execute one or more types of the information processing;
  an execution control unit configured to have the execution unit being capable of executing one of the types of the information processing execute the information processing of the execution request information preserved by the first preservation unit; and
  a second preservation unit configured to preserve a stop command of the execution unit;

wherein, if the execution unit does not execute the information processing, the execution control unit checks the second preservation unit at predetermined intervals if the second preservation unit preserves the stop command to have the execution unit execute a stop procedure, and if the execution unit executes the information processing, the execution control unit checks the second preservation unit after the information processing has been completed,
 wherein the execution unit is configured to stop the execution unit according to the stop command and subsequently delete a file indicating the stop command of the execution unit from a predetermined file storage location provided in a worker server;
 wherein the worker server is external to the information processing apparatus, and
 wherein the worker server notifies a user of the information processing apparatus that creates the stop command in the second preservation unit of a stop of the execution unit after the file is deleted.

10. A stop method executed by an information processing system including a memory configured to store a program, a processor configured to execute the program that causes the information processing system perform the method and one or more information processing apparatus, the method comprising:
 preserving execution request information for information processing;
 executing one or more types of the information processing;
 controlling to have the executing being capable of executing one of the types of the information processing execute the information processing of the execution request information preserved by the preserving; and
 preserving a stop command of the executing;
 wherein, if the executing does not execute the information processing, the controlling checks the preserving of the stop command at predetermined intervals if the preserving of the stop command has been done to have the executing execute a stop procedure,
 and if the executing executes the information processing, the controlling checks the preserving of the stop command after the information processing has been completed,
 wherein the executing stops the executing according to the stop command and subsequently deletes a file indicating the stop command from a predetermined file storage location provided in a worker server;
 wherein the worker server is external to the information processing apparatus, and
 wherein the worker server notifies a user of the information processing apparatus that creates the stop command of a stop of the executing after the file is deleted.

* * * * *